(12) United States Patent
Szeto

(10) Patent No.: US 9,947,016 B2
(45) Date of Patent: Apr. 17, 2018

(54) TECHNIQUES FOR IMPROVING USER ENGAGEMENT WITH ADVERTISEMENTS

(75) Inventor: Christopher T. Szeto, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 1368 days.

(21) Appl. No.: 11/779,770

(22) Filed: Jul. 18, 2007

(65) Prior Publication Data

US 2009/0024463 A1    Jan. 22, 2009

(51) Int. Cl.
*G06Q 30/00* (2012.01)
*G06Q 30/02* (2012.01)

(52) U.S. Cl.
CPC ......... *G06Q 30/02* (2013.01); *G06Q 30/0269* (2013.01); *G06Q 30/0277* (2013.01)

(58) Field of Classification Search
CPC .................................................. G06Q 30/0241
USPC ................................................... 705/14, 14.4
See application file for complete search history.

(56) References Cited

U.S. PATENT DOCUMENTS

| | | | |
|---|---|---|---|
| 5,929,857 A * | 7/1999 | Dinallo et al. | 715/840 |
| 6,081,830 A * | 6/2000 | Schindler | 709/204 |
| 6,326,985 B1 | 12/2001 | Tazoe et al. | |
| 6,544,295 B1 * | 4/2003 | Bodnar | 709/219 |
| 7,225,141 B2 | 5/2007 | Calderaro et al. | |
| 7,225,142 B1 * | 5/2007 | Apte et al. | 705/14.39 |
| 7,383,308 B1 * | 6/2008 | Groves et al. | 709/206 |
| 7,801,971 B1 * | 9/2010 | Amidon et al. | 709/217 |
| 2003/0182184 A1 * | 9/2003 | Strasnick et al. | 705/14 |
| 2003/0195801 A1 * | 10/2003 | Takakura et al. | 705/14 |
| 2005/0021624 A1 * | 1/2005 | Herf et al. | 709/204 |
| 2006/0129455 A1 * | 6/2006 | Shah | 705/14 |
| 2007/0121843 A1 * | 5/2007 | Atazky et al. | 379/114.13 |
| 2007/0130126 A1 | 6/2007 | Lucovsky et al. | |
| 2007/0198340 A1 | 8/2007 | Lucovsky et al. | |
| 2007/0198342 A1 | 8/2007 | Collison et al. | |
| 2007/0198343 A1 | 8/2007 | Collison et al. | |
| 2007/0198344 A1 | 8/2007 | Collison et al. | |
| 2007/0198500 A1 | 8/2007 | Lucovsky et al. | |

(Continued)

FOREIGN PATENT DOCUMENTS

| | | |
|---|---|---|
| JP | 11-003348 | 1/1999 |
| JP | 11-212534 | 8/1999 |
| JP | 2000-194728 | 7/2000 |

(Continued)

OTHER PUBLICATIONS

International Search Report and Written Opinion dated Jan. 28, 2009 for corresponding PCT Application No. PCT/US2008/069679.

(Continued)

*Primary Examiner* — Mario C Isoif
(74) *Attorney, Agent, or Firm* — Weaver Austin Villeneuve & Sampson LLP

(57) ABSTRACT

Methods and apparatus are described for stimulating user engagement with advertising content. Presentation of an interface in a display for viewing by a user is facilitated. The interface includes a content window occupying a substantially fixed location in the interface. Presentation of a sequence of units of content in the content window, some of which are advertisements is facilitated. Various techniques are described to encourage user engagement and interaction with the content window.

31 Claims, 15 Drawing Sheets

(56) References Cited

U.S. PATENT DOCUMENTS

| | | | |
|---|---|---|---|
| 2007/0198921 | A1 | 8/2007 | Collison et al. |
| 2008/0072249 | A1* | 3/2008 | Hovnanian et al. ............ 725/34 |

FOREIGN PATENT DOCUMENTS

| | | |
|---|---|---|
| JP | 2001-109696 | 4/2001 |
| JP | 2001-167199 | 6/2001 |
| JP | 2002-083212 | 3/2002 |
| JP | 2002-092024 | 3/2002 |
| JP | 2002-123477 | 4/2002 |
| TW | 200723049 | 6/2007 |
| WO | 97/32258 | 9/1997 |
| WO | 99/13423 | 3/1999 |

OTHER PUBLICATIONS

Google's Friend to Friend Ad Network, http://www.roughtype.com/archives/2007/08/googles_friendt.php, Aug. 27, 2007.

Google, Gmail: Help Center—What are 'Web Clips'?, http://mail.google.com/support/bin/answer.py?answer=18219, Feb. 5, 2007 (2 pgs.).

Taiwan Office Action dated Nov. 21, 2011, Application No. 97126885.

Chinese First Office Action dated Apr. 6, 2011, CN Application No. 200880025060.1.

Korean First Office Action dated May 26, 2011, KR Application No. 2010-7003423.

JP patent application No. 2010-517078, Notification of Reasons for Refusal dated Feb. 9, 2012.

JP patent application No. 2010-517078, Decision for Refusal dated Jun. 21, 2012.

A. Takahashi, "Reality and trend of new communication tools on many social networks," DOS/V magazine, Japan, Softbank publishing Limit, No. 266, Jan. 2005.

Nikkei Pasocon, No. 515, Nikkei Personal Computing, [Q & A], Japan, Nikkei Business Publication, Inc., Oct. 9, 2006, vol. 515, p. 127.

Y. Misawa, Club Internet, ASAHI Personal Computer, No. 276, Japan ASAHI Newspaper, Nov. 1, 2000, pp. 86-87.

TW patent application No. 97126885, Office Action dated Jul. 20, 2012.

TW patent application No. 97126885, Office Action dated May 27, 2013.

CN patent application No. 200880025060.1, Office Action dated Mar. 1, 2012.

TW patent application No. 97126885, Office Action dated Jul. 14, 2015.

TW patent application No. 97126885, Notice of Allowance dated Nov. 23, 2015.

Indian Office Action dated Mar. 13, 2017, in Application No. 915/CHENP/2010.

* cited by examiner

TECHNIQUES FOR IMPROVING USER ENGAGEMENT WITH ADVERTISEMENTS

BACKGROUND OF THE INVENTION

The present invention relates to online advertising and, in particular, to techniques for improving the likelihood that users will notice and interact with online advertisements.

Providers of advertising services on the Web are facing considerable challenges which relate to the increasing tendency of users to ignore ad content. A balance must be struck between presenting advertisements which are sufficiently eye-catching to result in revenue, but which are not so intrusive that they negatively impact user experience. This balance is becoming increasingly difficult to achieve as users become more and more immune to extraneous information associated with web pages; a problem often referred to in the industry as "ad blindness."

This problem is becoming more of an issue as web sites migrate from the Web 1.0 model of page views (in which a new ad is presented each time a new page is presented), to the Web 2.0 model in which interfaces behave more like client applications in which only portions of the interface change over time. This migration has resulted in need to rotate ad content in static locations in the interface layout to yield the same number of page views as with the previous model. Unfortunately, the static location in the layout makes it even easier for users to ignore the ad content.

SUMMARY OF THE INVENTION

According to the present invention, various methods and apparatus are provided for stimulating user engagement with advertising content. An interface is presented in a display for viewing by a user. The interface includes a content window occupying a substantially fixed location in the interface. A sequence of units of content is presented in the content window. First ones of the units of content are advertisements.

According to one class of embodiments, second ones of the units of content are non-commercial media characterized by a predetermined relevance to the user.

According to a second class of embodiments, the interface further includes at least one control with which the user may move backward and forward in the sequence.

According to a third class of embodiments, sharing of a selected one of the first units of content is facilitated using a drag-and-drop operation.

A further understanding of the nature and advantages of the present invention may be realized by reference to the remaining portions of the specification and the drawings.

DETAILED DESCRIPTION OF SPECIFIC EMBODIMENTS

Figure 1:
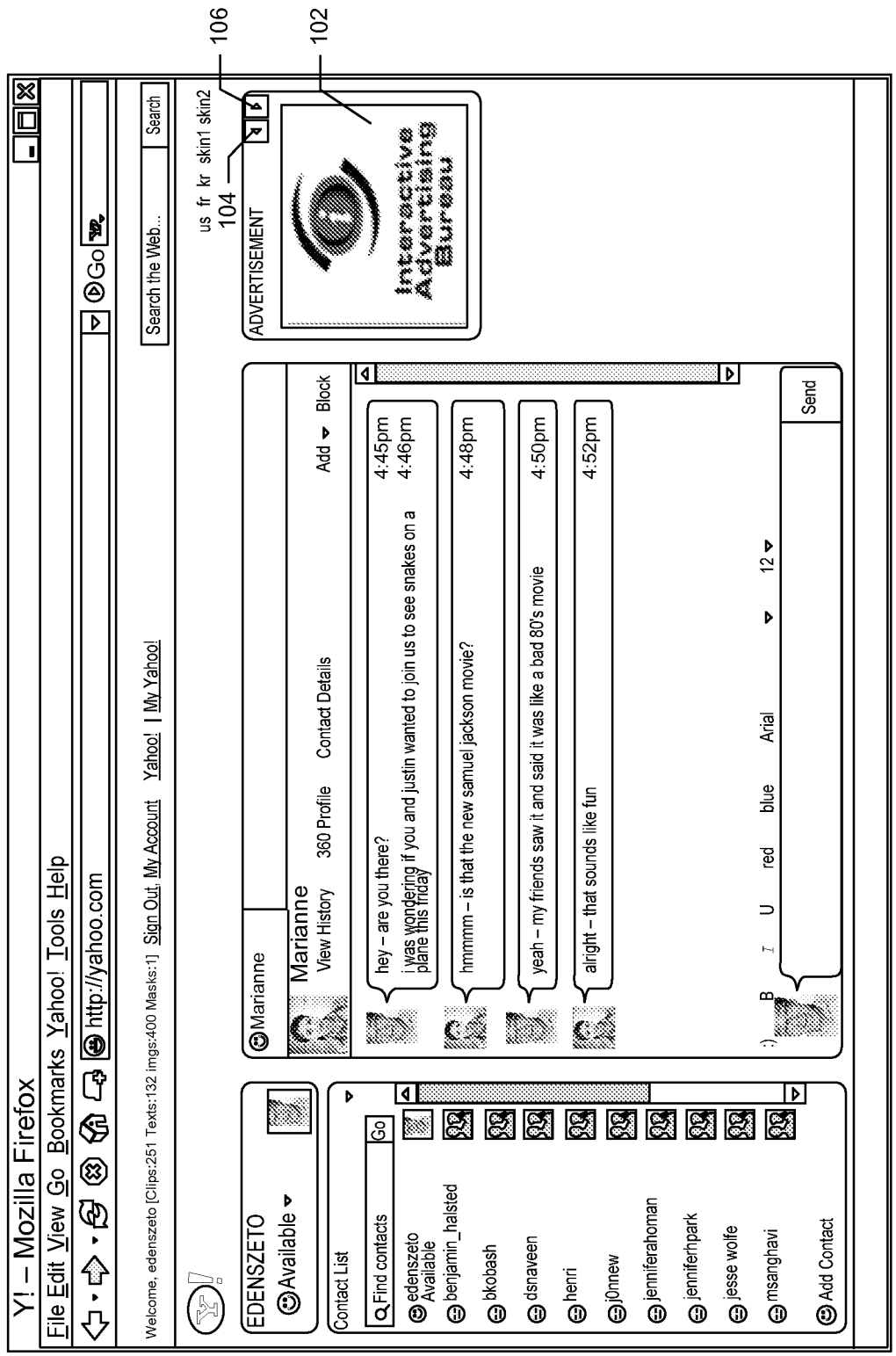
FIGS. 1-13 are screen shots illustrating operation of a specific embodiments of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, user engagement with advertisements and ad content is improved using a variety of techniques. For example, according to one class of embodiments, user engagement with ad content is improved by giving the user some measure of control over the ad content being presented. According to another class of embodiments, social media relevant to the user is integrated with the ad content being presented. Examples of relevant social media include media and content created by individuals to be seen by and shared with others, e.g., photos, videos, blog entries, etc. According to yet another class of embodiments, the user is allowed to easily share ad content with other users by, for example, a simple drag-and-drop operation. By using these techniques, either alone or in combination with each other, user engagement with the presented ad content may be improved.

According to a subset of the first class of embodiments, controls are provided that enable a user to move back and forth through a sequence of ads (possibly including other content as discussed below). A specific example of such an embodiment may be understood with reference to the screen shots of FIGS. 1-3. The ads are presented in a rotation sequence in what appears to be a fixed window in the interface resembling a media player (window 102). According to some embodiments, the interface and window 102 are implemented using Asynchronous JavaScript and XML (AJAX) techniques, or equivalent techniques in which only small amounts of data are exchanged with a server so that the entire web page does not have to be reloaded each time the user requests a change. Other techniques might include for example, the use of Flash or Active X controls which use a normal TCP socket. It should also be noted that these are merely examples and that the window does not necessarily need to be fixed in the interface.

In this example, associated with window 102 are two control buttons, a first (control 104) which allows the user to revisit previously presented ads (i.e., to step backwards through the sequence), and a second (control 106) which allows the user to move forward in the rotation. In specific implementations for web applications, this may be achieved without reloading the entire page. Thus, for example, selection of control 104 in the interface of FIG. 3 allows the user to successively step backward to the ads of FIGS. 2 and 1.

Figure 3:
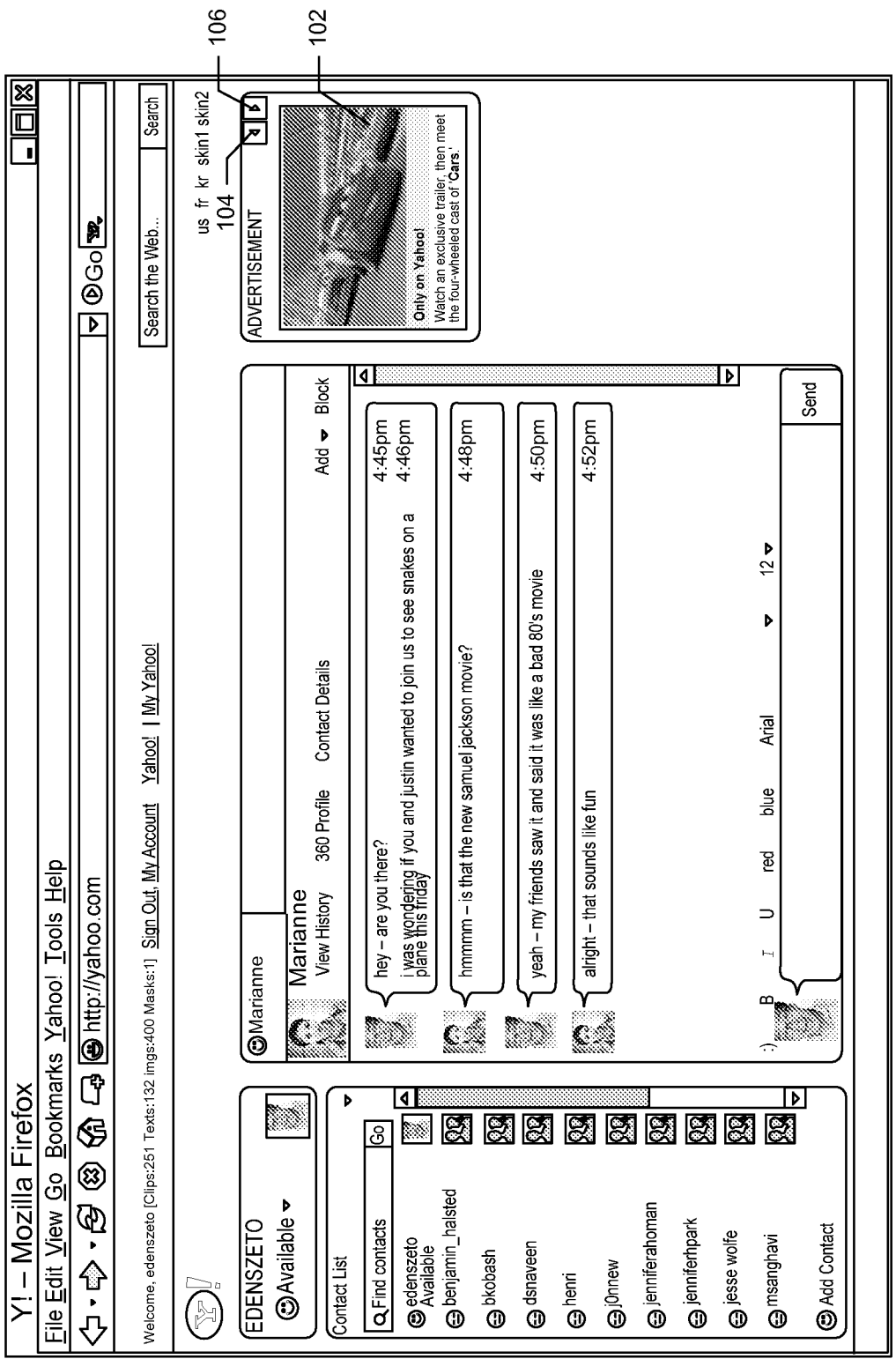

According to one embodiment, the user is only allowed to go forward to the point in the rotation from which the backwards movement in the rotation was originally initiated, i.e., the ad in FIG. 3 in the preceding example. In this way, the user cannot readily skip ads in the rotation. Alternatively or in addition, the rate at which the user may jump forward in a sequence may be limited.

As yet another alternative, the user may be allowed to jump forward in the sequence without limitation. However, to avoid counting skipped ads as ad impressions, only social media are presented once the point is reached in the rotation from which the backwards movement in the rotation was originally initiated. This allows the user to have a satisfying experience in that the desire to jump ahead is not thwarted, and relevant updates relating to the user's community are presented. It also prevents unwarranted charges for ad impressions which would be ignored. When the user stops jumping ahead in the sequence, normal rotation of ads recommences.

It will be understood that these controls are merely examples of controls which may be provided to the user to enable the user to control the experience to some degree, and that other types of controls may be provided without departing from the scope of the invention. For example, a pause control might be provided to temporarily prevent the rotation from moving ahead. In another example, the rotation would automatically pause when the user is engaged in the area, e.g., the mouse is in the vicinity. This way, the ad doesn't rotate as the user is trying to click on the ad or move back or forward. Other suitable types of controls will be apparent to those of skill in the art.

According to specific embodiments, user behaviors relating to the use of such controls may be tracked to provide valuable feedback regarding ad content. For example, if many users consistently go back through their respective ad rotations to view, interact with, or share a specific ad (as described below), it may be inferred that the ad in question is effective in some respect. And in ecosystems in which demographic and online behavioral information about users is available (e.g., any of a variety of Yahoo! properties including, for example, Yahoo! Messenger) such information may be leveraged to derive detailed and sophisticated data for specific ad content.

Such approaches enabled by the present invention are to be contrasted with, for example, techniques by which users are invited to rate ads. That is, it is the rare (and likely non-representative) user who will take the time to respond to such an invitation. By contrast, by giving the user some level of control over the ad content experience, implicit but very specific feedback on the effectiveness of particular ads may be derived without actually interrupting the user's experience to get the feedback.

Figure 2:
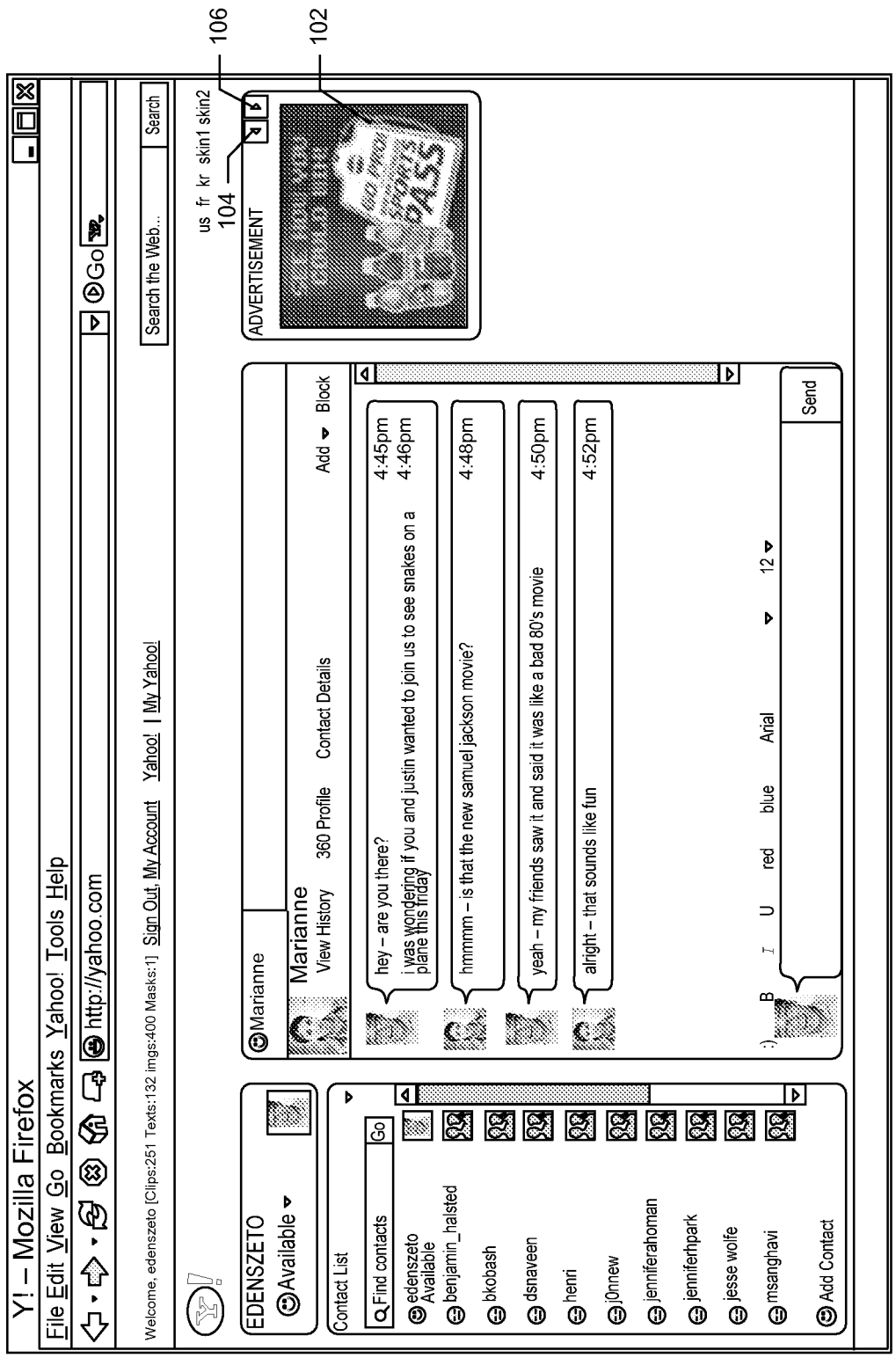

According to a subset of the second class of embodiments mentioned above, social media relevant to the user is inserted in an ad sequence which is rotating through a window in an interface such as, for example, window 102 of FIGS. 1-3. According to some of these embodiments, the social media are identified with reference to a group of users related in some way to the user to whom the ads and social media are being presented. For example, the group of users may correspond to the user's buddy list in a messaging application, e.g., Yahoo! Messenger. Alternatively, the group of users may be derived from some other form of contacts list, e.g., an address book, or by explicit designation by the user himself. More generally, any group of users which have some relevance to the user viewing the ad content may be employed without departing from the scope of the invention.

Figure 4:
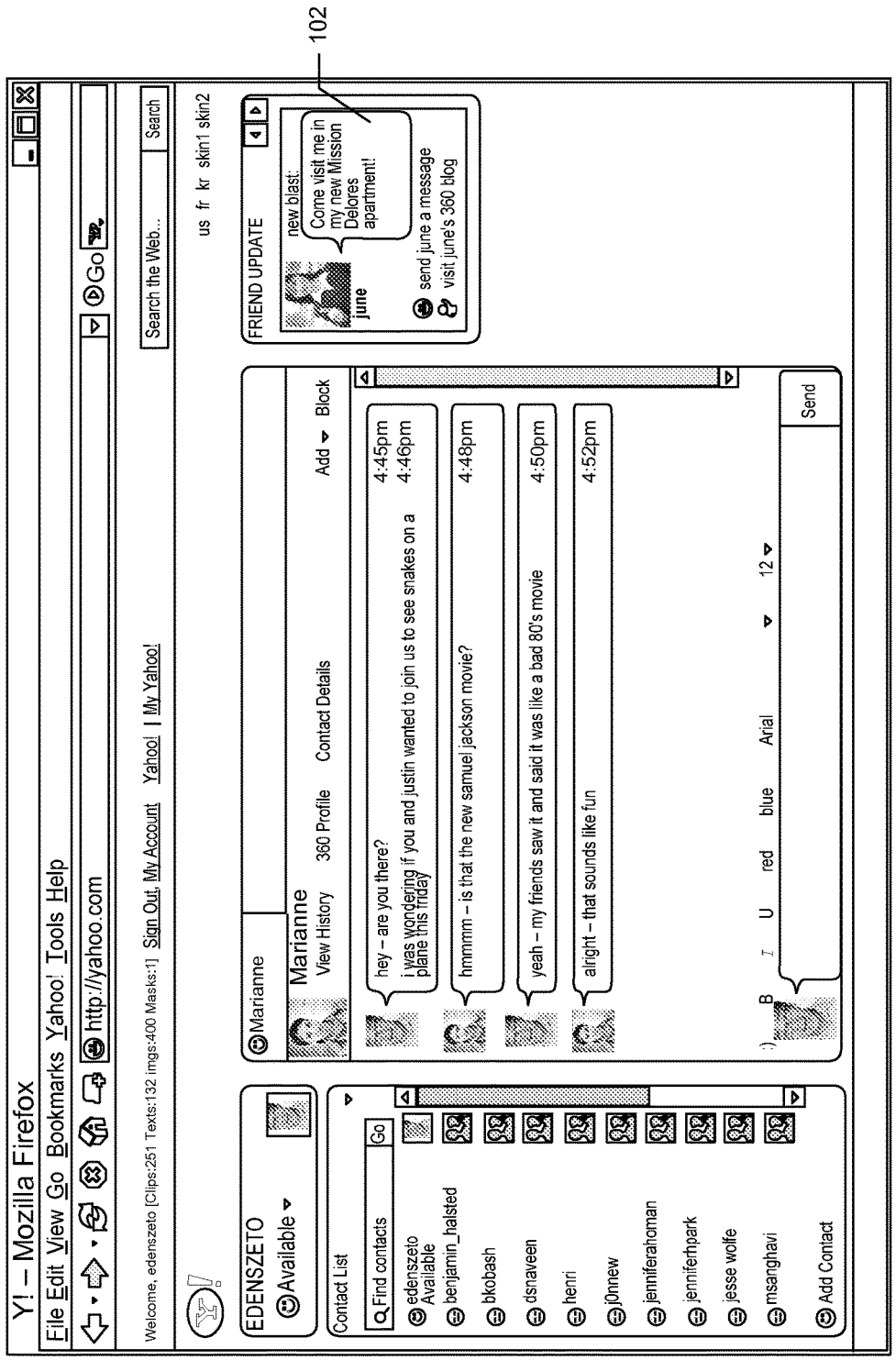
Figure 5:
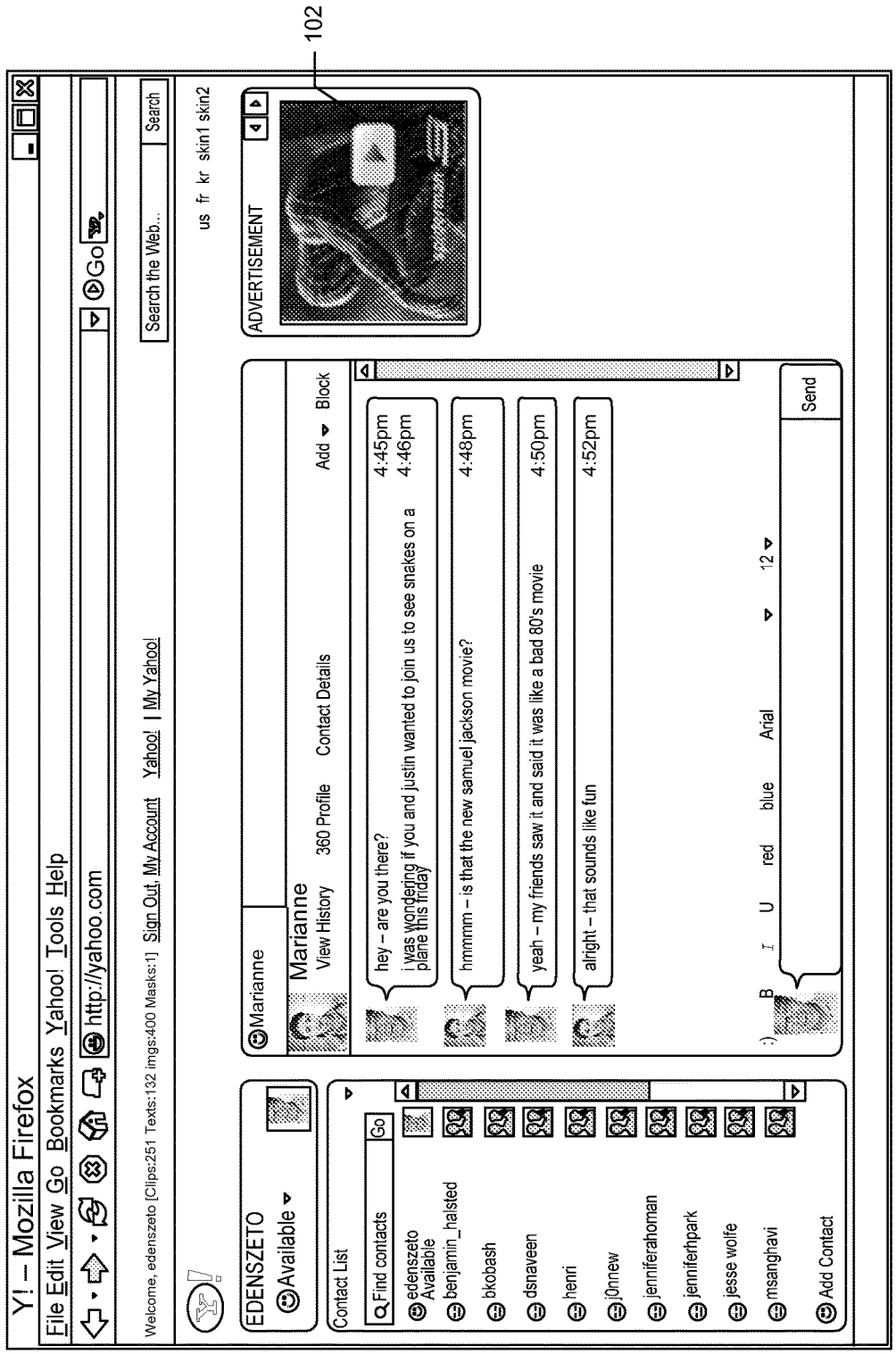

The nature of the social media inserted or referred to in the ad sequence may also vary considerably without departing from the invention. For example, if someone in the group of users publishes content, the social media presented in the ad sequence could serve as a notification of that publication as well as a link to the published content. An example of such relevant social media is shown in FIG. 4 which illustrates the presentation of an announcement and invitation from one of the user's contacts in window 102. The content might relate to a new blog entry recently published by that contact and include a link to the user's blog. FIG. 5 then illustrates that the rotation of the ad sequence continues with a new ad replacing the social media content of FIG. 4 in window 102.

Figure 6:
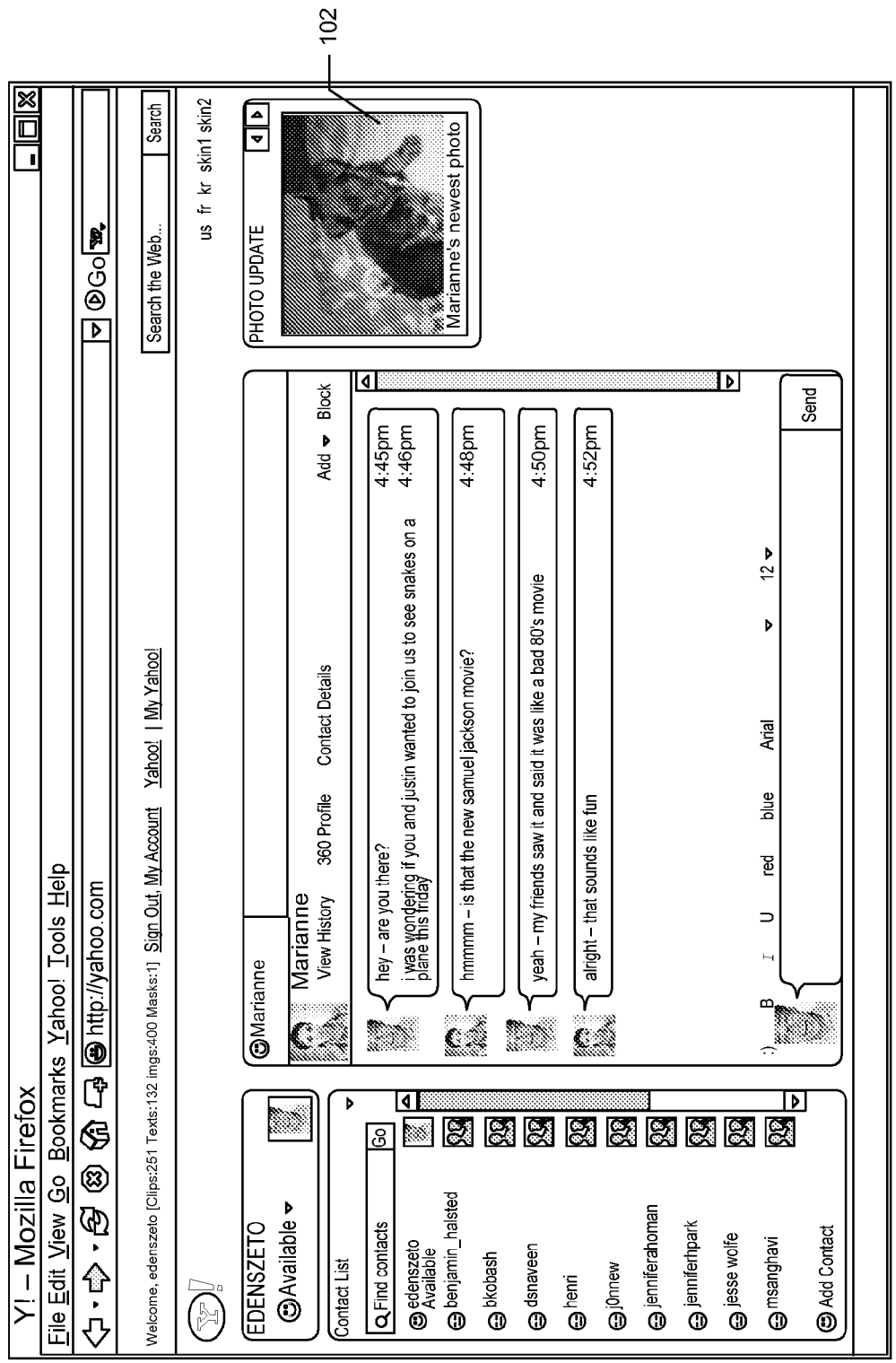

It will be understood that the nature of the social media which is integrated with ad content may vary considerably without departing from the invention. Virtually any type of content or update which relates to one or more members of a group or community of users with which the user is associated may be employed. According to some embodiments, interrelationships among various parts of an ecosystem with which the group or community is associated may be leveraged to enable highly engaging social media. For example, the overall Yahoo! ecosystem includes a variety of properties which may interrelate in such a way as to enable the identification and delivery of such social media according to the invention. In one example, a Yahoo! Messenger user might be presented with social media which indicates activity by one of his contacts on another Yahoo! property, e.g., Yahoo! Photos as shown in FIG. 6. Links to content on other Yahoo! properties relating to that contact may also be included (e.g., links to a blog or home page).

Figure 7:
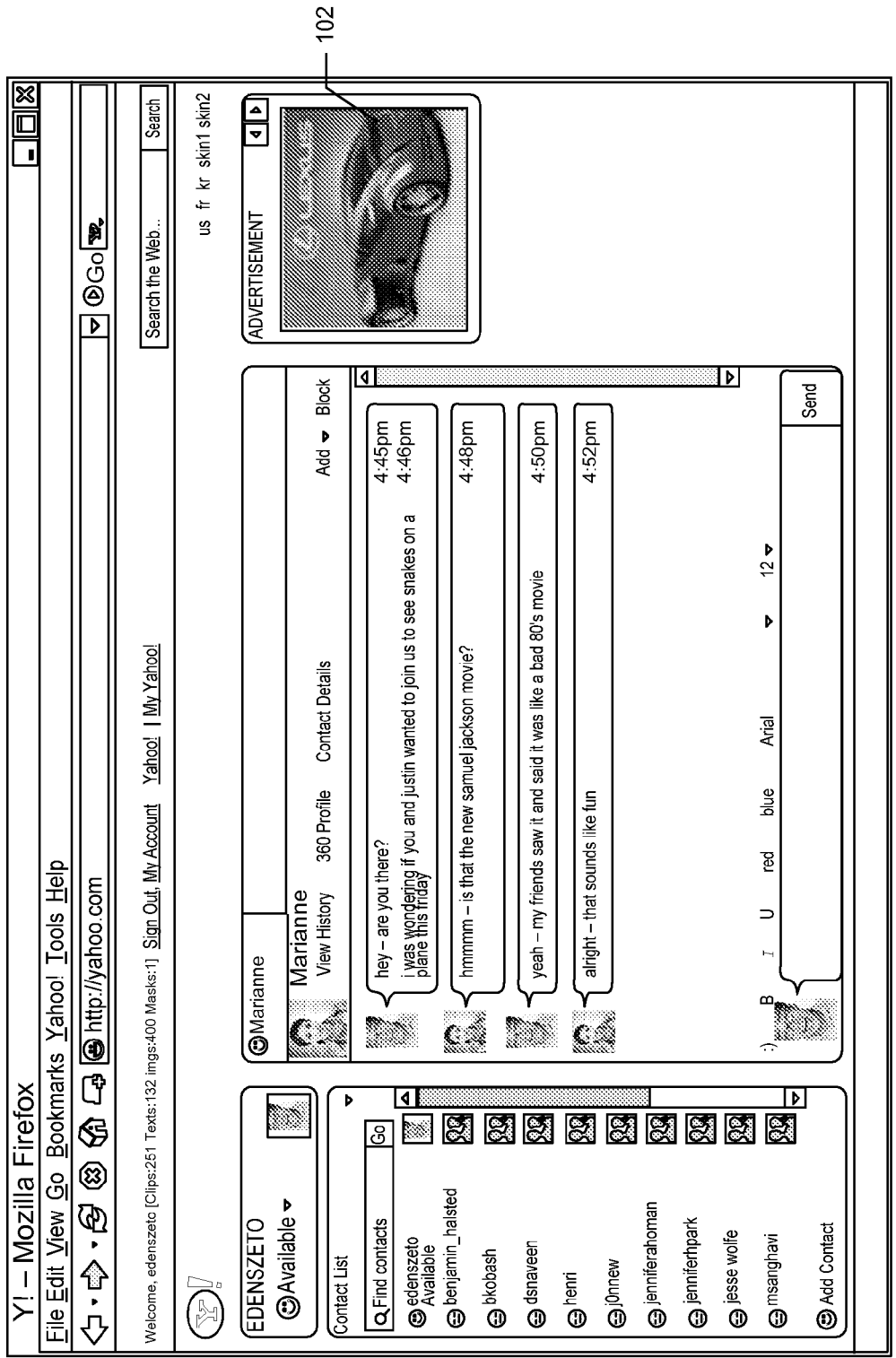

As will be understood, the format with which ads presented according to various embodiments may vary considerably without departing from the invention. According to a specific embodiment illustrated thus far, for example, in the interfaces of FIGS. 1-6, the window in which the ad rotation and social media are presented (e.g., window 102) is an IAB standard size rectangle (e.g., 180×150) which is suitable for rich media (e.g., video), but which may not be as large as an advertiser might like. Therefore, according to a specific embodiment illustrated in FIGS. 7 and 8, when the user "mouses over" the window, it increases in size from the smaller standard size (FIG. 7) to a larger size (FIG. 8) which may be standard size large rectangle (e.g., 300×250) or a custom size. This allows for development of an application within a Web 2.0 framework in which interface real estate is at a premium while balancing such considerations with a rich experience when a user interacts with the window.

In addition, the sequence rotation may be paused during mouse over to allow the user enough time to experience the content. That is, if the sequence rotation is not paused, the user may not have sufficient time to click on the ad or social media before the next content is presented. This is obviously undesirable, particularly in view of the fact that the user has already exhibited an interest in the content by moving the cursor there in the first place. According to embodiments in which the content is some form of video, "play" and "pause" controls may also be presented so that the user can control playback of the video. In one implementation, when the user selects the "play control," the size of the playback window depends on whether the cursor remains over the window. That is, if the user moves the cursor outside of the window, it may return to its original size with the video continuing to play until completion or until paused. The sequence rotation can then begin again.

Figure 8:
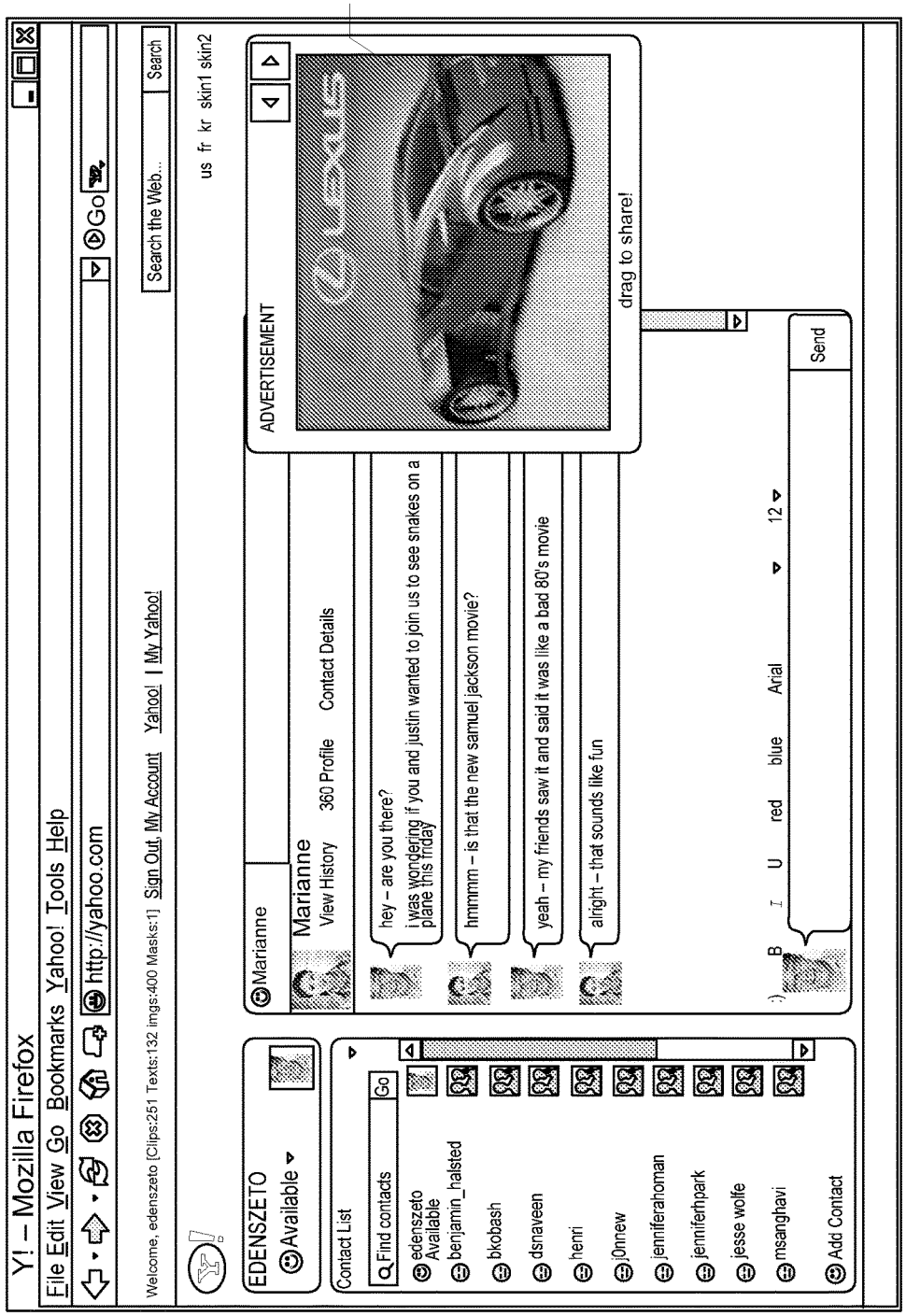

According to some embodiments, users are allowed to share at least some of the ads and social media like any other media. For example, as shown in FIG. 8, when the user mouses over window 102 and it increases in size, a user "call to action" is also presented in the window frame which informs the user of the ability to share the content currently being presented. In this example, the sharing mechanism identified is a "drag-and-drop" operation, but any suitable sharing mechanism may be employed. The pausing of the rotation sequence is also useful in such implementations as it will allow the user more time to share the content.

Figure 9:
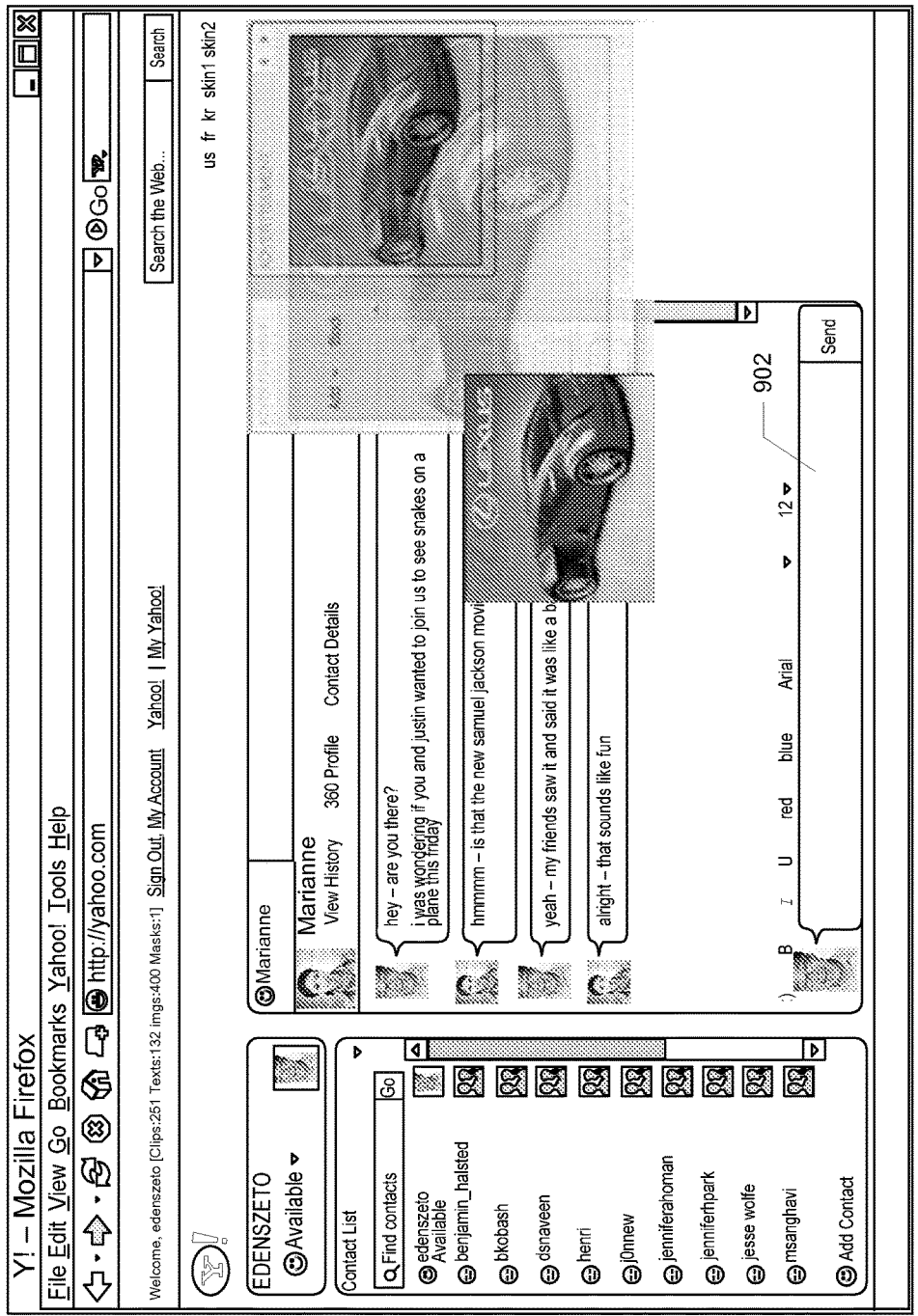
Figure 10:
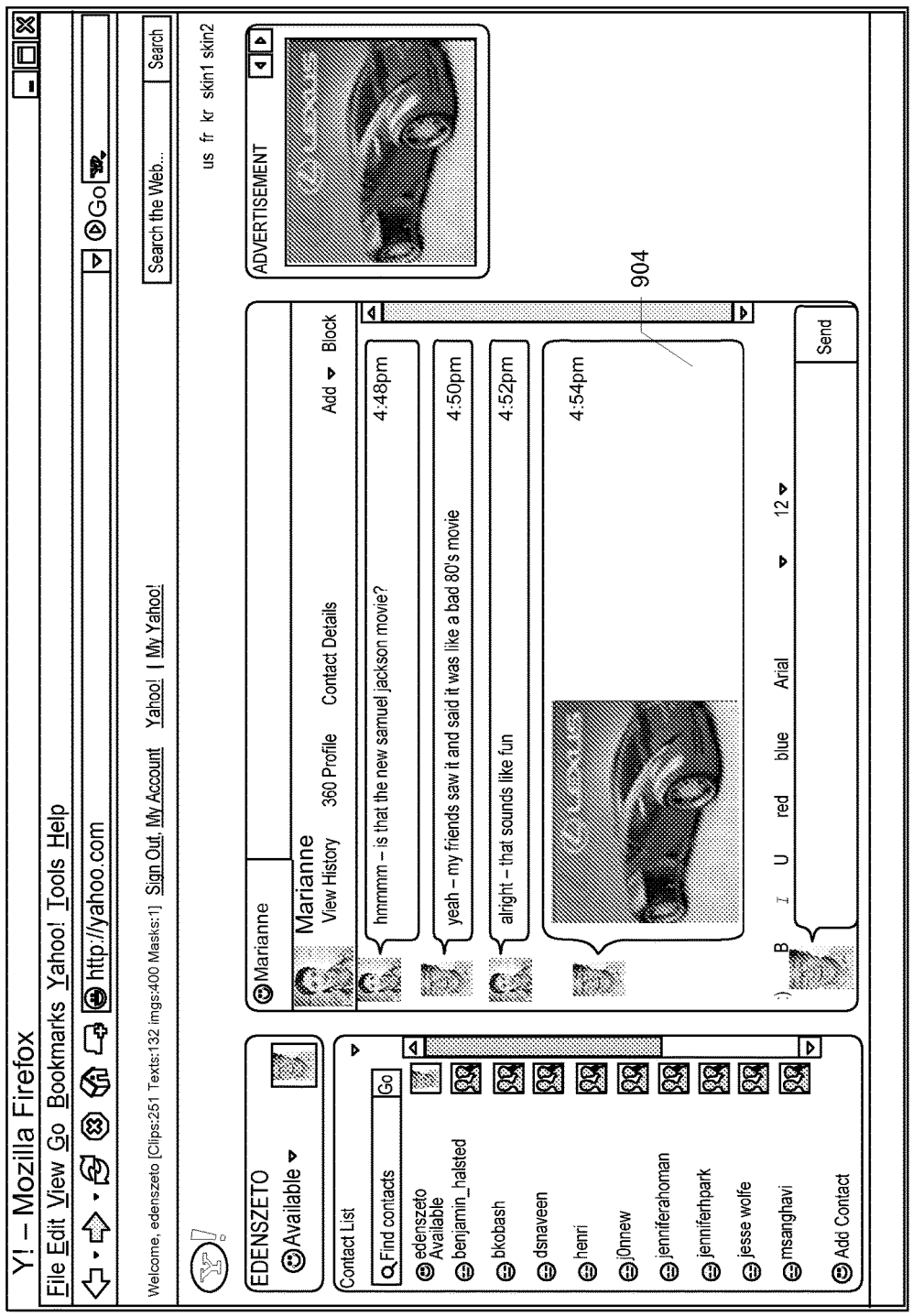
Figure 11:
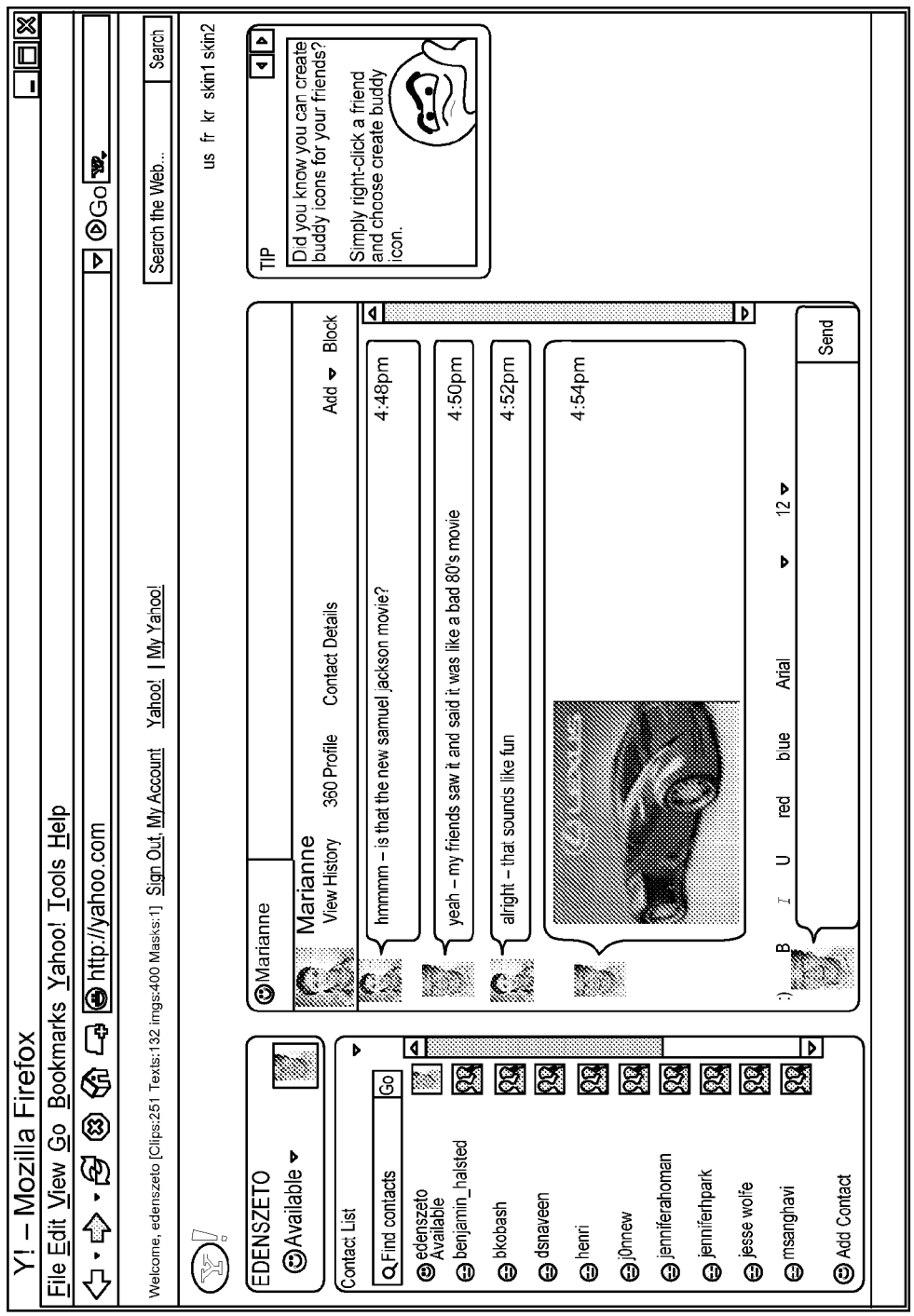

According to the example embodiment illustrated in FIG. 9, the user may drag and drop a representation of the content into other areas of the interface such as, for example, instant messaging window 902, in response to which a new message 904 from the user containing the shared content (and/or a link to the shared content) is generated and communicated to one or more other users involved in the current communication session as shown in FIG. 10. The rotation sequence then continues as shown in FIG. 11.

Figure 12:
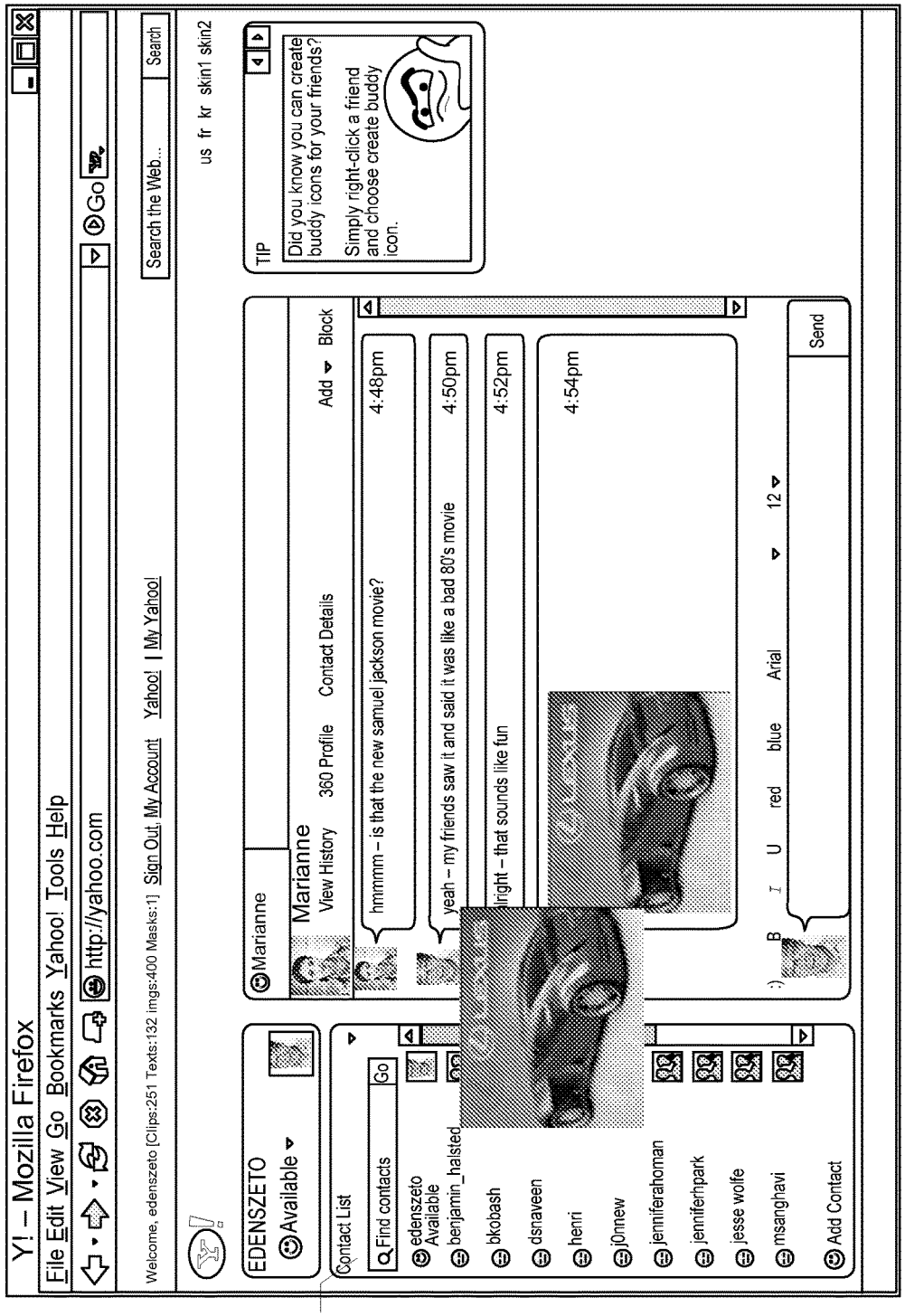
Figure 13:
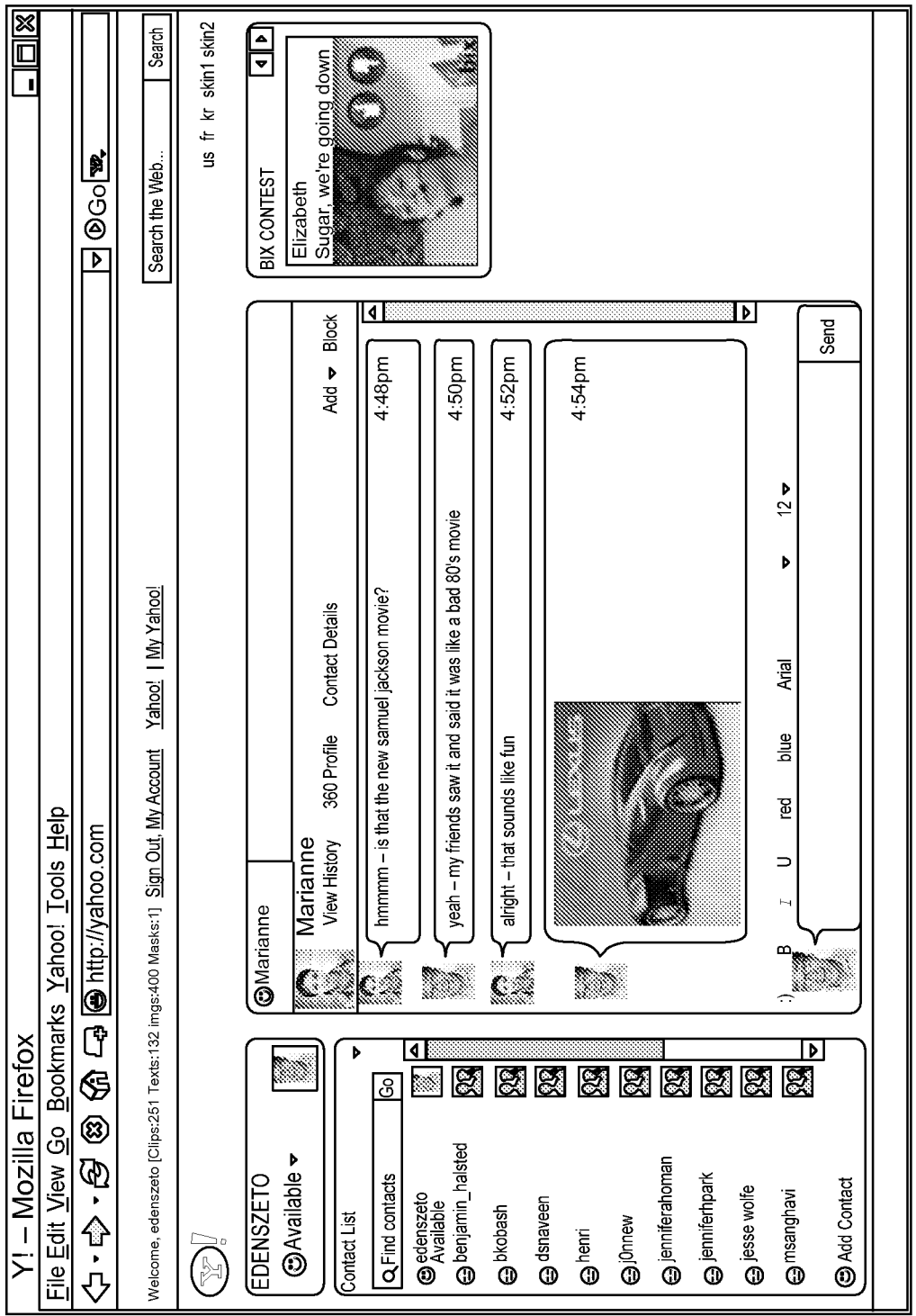

To create a new conversation based on the shared content, the user may simply drag-and-drop the representation of the content on a contact in contact list 906 as illustrated in FIG. 12. The rotation sequence then continues as shown in FIG. 13. Each recipient of the shared content may then share the content with members of their own community, e.g., as defined by their own contacts list, using any of a variety of sharing mechanisms including, for example, drag-and-drop operations. Thus, the communication of the shared content may become viral in nature.

It should be noted that messaging window 902 and contacts list 906 are merely examples of drag-and-drop destinations for sharing content presented according to an embodiment of the invention. A wide variety of other destination types may be employed with various implementations to effect sharing of ad and social media content including, for example, emails, folders in a file system, documents, web pages, etc.

Figure 14:
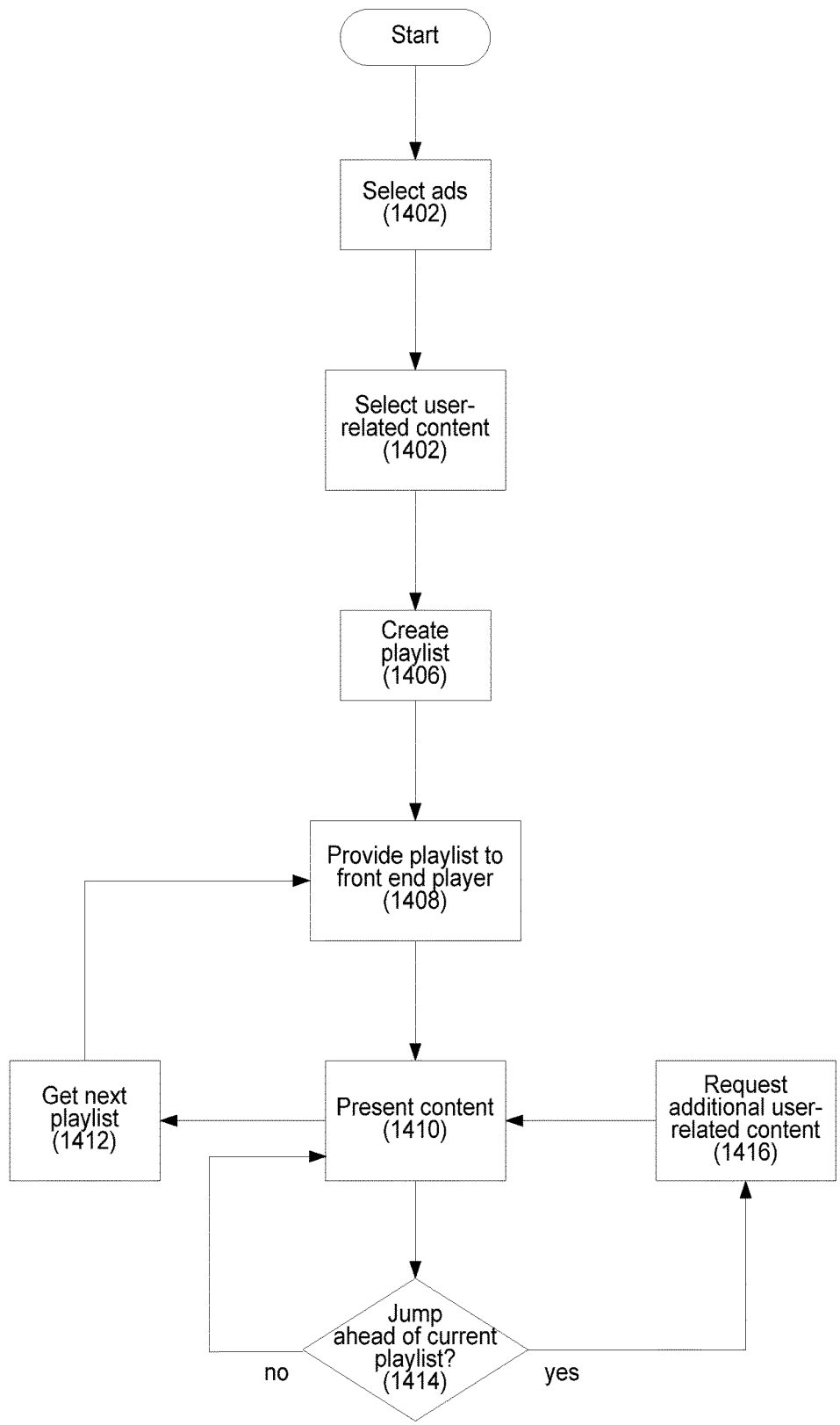
FIG. 14 is a flowchart illustrating operation of a specific embodiments of the invention.

According to various embodiments, operation of an example of which is illustrated in FIG. 14, a back end media playlist creator in combination with a front end media player controls presentation of the sequence of ads and social media. The media playlist creator identifies both ad content and social media content with reference to the user or the user's activities and/or the group or community of users associated with the user. For example, the media playlist creator may select ads based on any of a variety of metrics such as user demographics, search keywords, context, etc. (1402).

The media playlist creator also selects user-related content (e.g., social media) with reference to any of a variety of metrics including, for example, the online activities of the user and/or a group or community of users associated with or identified by the user (1404). The media playlist creator then creates a playlist which, according to a specific implementation, is a list of media identifiers corresponding to the ad and user-related content (1406). The media playlist creator then provides the playlist to a front end player (1408) which then uses the playlist to control presentation of the content in accordance with the logic built into the front end player (1410). This logic may implement various combinations of the functionalities described above with reference to FIGS. 1-13.

According to one embodiment, the media playlist creator iteratively provides playlists to the front end (1412), i.e., some number of content items at a time. If the user is allowed to jump ahead, each time the user attempts to go beyond the current playlist (1414), a request for additional user-related content is made (1416).

In some implementations, when content is shared within the context of the messaging ecosystem depicted in FIGS. 1-13, the media identifier associated with the shared content is provided to the recipient so that the content may be readily accessed within the messaging application. This may result, for example, in the content being viewed or played directly in the received message. According to various embodiments, the ads and/or the social media may be a wide variety of simple and complex media types including, for example, images, video, audio, animation, mixed, etc.

According to some of these embodiments, to protect against click fraud, users can only share ads presented to them by the media playlist creator, i.e., users aren't allowed to invoke particular ads on their own. According to other embodiments, a variety of fraud detection and prevention techniques may be employed such as, for example, monitoring IP addresses and rate limiting. And in particular online ecosystems, e.g., the Yahoo! Messenger community of users, the availability of user identity can also be leveraged to prevent fraud.

Among the benefits of sharing ads is the viral distribution of ad content as users share ads of interest with friends who may, in turn, share the ads with others. In addition, because sharing correlates with a strong interest in the ad content (at least on the part of the sharer), this will increase the likelihood of "click-through" by those with whom the ad content is shared.

According to specific embodiments of the invention, the social media identified and presented to the user need not be limited by the particular ecosystem of which the user and the associated group or community of users are a part. For example, the relevant group for social media may be defined by a particular user's contacts list in Yahoo! Messenger. And while social media associated with the users in that group within the various Yahoo! properties may be readily incorporated into an ad sequence rotation, the present invention is not limited to only those media. That is, according to such embodiments, social media may be derived from a wide variety of online sources without departing from the scope of the invention. Virtually any source of social media for a particular individual may be employed including, for example, personal and corporate web sites, social networking sites, content sharing sites, etc. The social media may be identified by, for example, the individual's given name. Alternatively, the individual's identifier within the ecosystem, e.g., email address, could be employed. That is, because the individual's name or email address is known, content published anywhere online may be identified and presented in accordance with embodiments of the invention.

Figure 15:
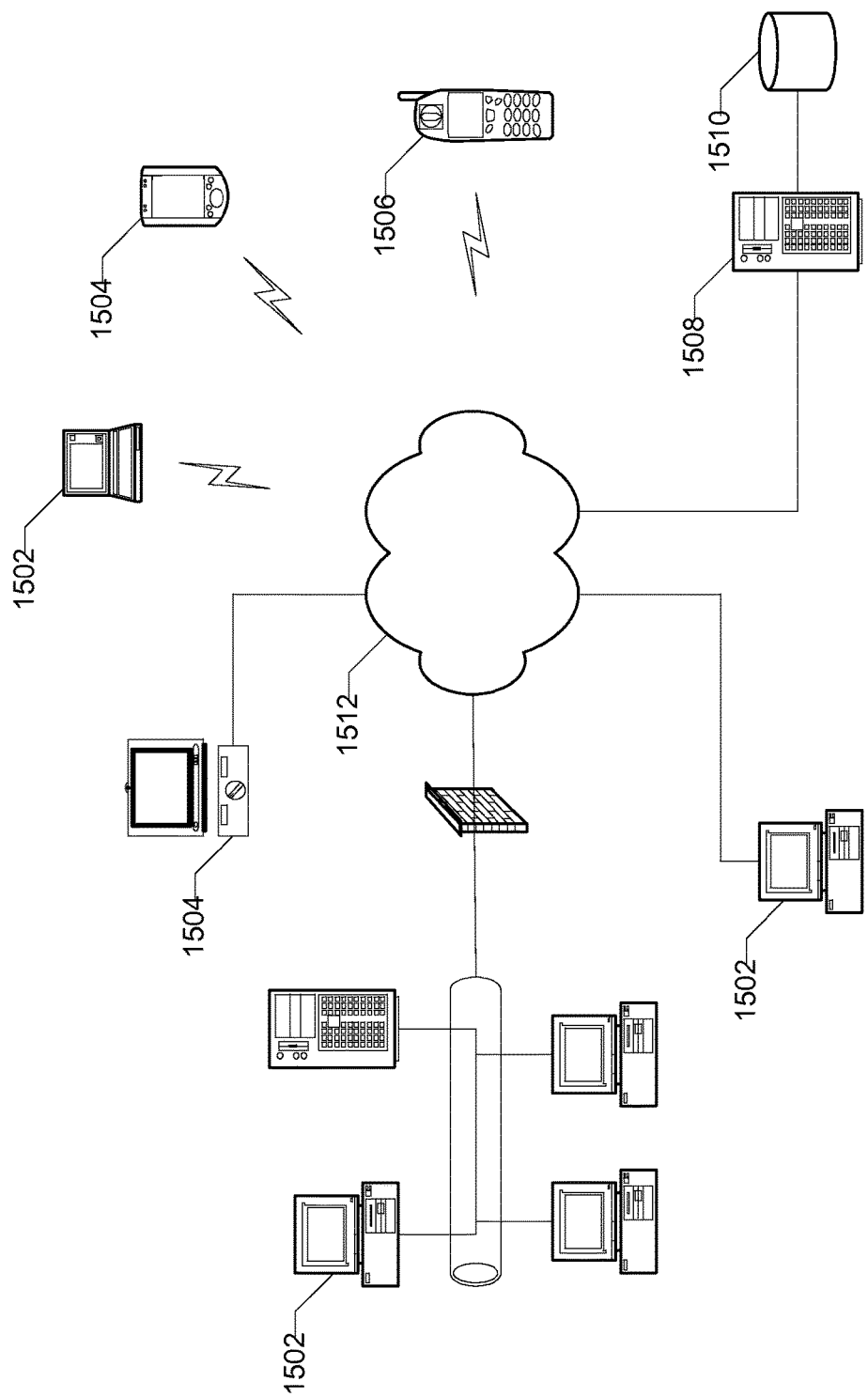
FIG. 15 is a block diagram in which embodiments of the invention may be implemented.

It should be noted that the present invention may be implemented on any computing platform(s) and in any network topology in which presenting advertising content and facilitating user engagement with that content are useful functionalities. For example and as illustrated in FIG. 15, implementations are contemplated in which the sequence of ads and social media and the related functionalities described herein are presented in interfaces on personal computers 1502, media computing platforms 1503 (e.g., gaming platforms, or cable and satellite set top boxes with navigation and recording capabilities), handheld computing devices (e.g., PDAs) 1504, cell phones 1506, or any other type of portable communication platform. The logic (e.g., as embodied in computer code or instructions) which controls the various functionalities associated with presentation of the ads and social media may be resident on such devices, e.g., as part of a browser or other application, or be served up from a remote site, e.g., in a Web page. The selection of ads and social media may be accomplished on one or more platforms (represented by server 508 and data store 510) remote from end user devices. The invention may also be practiced in a wide variety of network environments (represented by network 512), e.g., TCP/IP-based networks, telecommunications networks, wireless networks, cable networks, etc.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations. According to various specific embodiments, aspects of the invention may be embodied in, for example, downloaded applications (e.g., an instant messenger application), a web-based application (e.g., web email), or a web-based social networking site. It should be noted, however, that these are merely a few examples of the many ways in which the embodiments of the invention may be implemented.

While the invention has been particularly shown and described with reference to specific embodiments thereof, it will be understood by those skilled in the art that changes in the form and details of the disclosed embodiments may be made without departing from the spirit or scope of the invention. For example, embodiments are described above in which social media are described as an example of content which may be introduced in a sequence of ads to improve user engagement with the area of the interface in which the ads are presented, and thus the ads themselves. However, while such social media may be highly effective for this purpose, the present invention is not limited to this example. Rather, user engagement with ads may be improved according to the invention using any of a wide variety of content likely to facilitate such engagement. For example, a user might subscribe to an RSS feed from a particular web site (e.g., a blog, a fantasy sports league, a news site, etc.). Because user interest can be inferred from the subscription, presenting content in the ad rotation relating to the web site, e.g., a notification of a new content posting, may serve to improve user engagement in a manner similar to the various types of social media described above. More generally, anything to which the user subscribes or in which the user expresses an interest may be used as a source of content which may be inserted in an ad sequence to enhance user engagement according to specific embodiments of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method comprising:
   providing for presentation via a display of a computing device for viewing by a user, an interface including a content window occupying a particular location in the interface, the interface being a web page;
   providing for presentation within the content window of the interface, units of content in a sequence such that the units of content rotate within the content window, wherein the units of content rotate within the content window such that each successive one of the units of content in the sequence replaces, in the content window of the interface, a previous one of the units of content in the sequence, first ones of the units of content comprising advertisements such that each of the first ones of the units of content includes an advertisement, and second ones of the units of content comprising social media that has been identified by a server with reference to a group of users related to the user such that each of the second ones of the units of content includes social media content, wherein the social media correspond to online activities of individuals in the group of users;
   providing at least one control in the interface with which the user may move backward and forward in the sequence;
   sharing a selected one of the first ones of the units of content in the sequence with a message recipient in response to a drag-and-drop operation that drags and drops the selected one of the first ones of the units of content from the content window onto a contact in a contacts list of the interface or to a message window of the messaging interface; and
   tracking user interaction with the sequence and the at least one control to measure the user engagement.

2. The method of claim 1, the method further comprising providing for presentation within the content window of the interface only the second units of content where the user attempts to move forward in the sequence beyond a most recently presented one of the first units of content.

3. The method of claim 1, the method further comprising:
   tracking user interaction with the at least one control and the sequence to measure the
   user engagement; and
   determining effectiveness of one of the first units of content based, at least in part, on the user engagement.

4. The method of claim 1, wherein the presentation of the units of content in the sequence in the content window continues after the selected one of the units of content is dragged.

5. The method of claim 1 wherein the social media comprise a notification that one of the individuals in the group of users posted content and a link to the posted content.

6. The method of claim 1 wherein the social media is further identified with reference to media to which the user subscribes, preferences of the user, or online behavior of the user.

7. The method of claim 1, wherein
   providing for presentation within the content window, units of content in a sequence, comprises:
   inserting the second ones of the units of content into an initial sequence of units of content that includes the first ones of the sequence of units of content, wherein the initial sequence of units of content is rotating within the content window of the interface.

8. The method of claim 1, wherein providing for
   presentation within the content window, units of content in a sequence comprises:
   presenting, in the content window of the interface, an initial sequence of units of content that includes the first ones of the units of content; and
   inserting the second ones of the units of content into the initial sequence of units of content.

9. The method of claim 1, further comprising:
   identifying the social media by the server with reference to the group of users related to the user.

10. The method of claim 1, further comprising:
    identifying the social media by the server from one or more web sites, the web sites
    including at least one of a content sharing web site, a social networking web site, a personal web site, or a corporate web site.

11. The method of claim 1, wherein the social media comprises a posting performed by one of the individuals in the group of users via another web site.

12. The method of claim 1, wherein the online activities of the individuals in the group of users are performed via one or more other web sites.

13. The method of claim 1, wherein the server is remote from end user devices of the user and the individuals in the group of users.

14. The method of claim 1, further comprising:
identifying, by a media playlist creator of the server, the social media with reference to the group of users related to the user;
creating, by the media playlist creator, a playlist including identifiers corresponding to the units of content in the sequence;
wherein providing for presentation within the content window of the interface, units of content in a sequence such that each successive one of the units of content in the sequence replaces, in the content window of the interface includes providing, by the media playlist creator, the playlist to a front end player.

15. A computing device, the computing device comprising a display and at least one processor configured to perform a method, comprising:
provide for presentation via the display of a computing device for viewing by a user, an interface including a content window occupying a particular location in the interface, the interface being a web page;
provide for presentation within the content window of the interface, units of content in a sequence such that the units of content rotate within the content window, wherein the units of content rotate within the content window such that each successive one of the units of content in the sequence replaces, in the content window of the interface, a previous one of the units of content in the sequence, first ones of the units of content comprising advertisements such that each of the first ones of the units of content includes an advertisement, the interface including at least one control with which the user may move backward and forward in the sequence;
provide for presentation within the content window of the interface, social media content such that the social media content replaces one of the first ones of the units of content within the content window, wherein the social media content has been identified by a server with reference to a group of users related to the user, wherein the social media correspond to online activities of individuals in the group of users;
provide at least one control in the interface with which the user may move backward and forward in the sequence; and
track user interaction with the sequence and the at least one control to measure the user engagement.

16. A computer program product comprising at least one non-transitory computer-readable storage medium having computer program instructions stored therein configured to enable at least one computing device to perform a method comprising:
providing for presentation via a display of a computing device for viewing by a user, an interface including a content window occupying a particular location in the interface, the interface being a web page;
providing for presentation within the content window of the interface, units of content in a sequence such that the units of content rotate within the content window, wherein the units of content rotate within the content window such that each successive one of the units of content in the sequence replaces, in the content window of the interface, a previous one of the units of content in the sequence, first ones of the units of content comprising advertisements such that each of the first ones of the units of content includes an advertisement;
providing for presentation within the content window of the interface, social media content such that the social media content replaces one of the first ones of the units of content within the content window, wherein the social media content has been identified by a server with reference to a group of users related to the user, wherein the social media correspond to online activities of individuals in the group of users;
providing at least one control in the interface with which the user may move backward and forward in the sequence; and
tracking user interaction with the sequence and the at least one control to measure the user engagement.

17. The computer program product of claim 16, the method further comprising inhibiting operation of the control where the user attempts to move forward in
the sequence beyond a point in the sequence from which backward movement in the sequence was initiated.

18. The computer program product of claim 16, the method further comprising sharing a selected one of the units of content in response to a drag-and-drop operation, the drag-and-drop operation dragging and dropping the selected one of the units of content to another window of the interface.

19. The computer program product of claim 16 wherein the social media comprises a notification that one of the individuals in the group of users posted content and a link to the content posted by the one of the individuals in the group of users.

20. The computer program product of claim 16, further comprising:
detecting user engagement in a vicinity of the content window; and
in response to detecting user engagement in a vicinity of the content window, pausing the rotation of the sequence of units of content within the content window of the interface.

21. The computer program product of claim 16,
wherein providing for presentation within the content window of the interface, units of content in a sequence comprises:
replacing, within the content window, one of the second ones of the units of content with one of the first ones of the units of content.

22. The computer program product of claim 16,
wherein the group of users correspond to a contacts list of the user.

23. The computer program product of claim 16, the method further comprising:
determining that the user is attempting to move forward in the sequence beyond a point in the sequence from which backward movement in the sequence was initiated; and
in response to determining that the user is attempting to move forward in the sequence beyond a point in the sequence from which backward movement in the sequence was initiated, presenting social media.

24. The computer program product of claim 16, wherein the social media comprises an event notification from one of the individuals in the group of users or an invitation from one of the individuals in the group of users.

25. The computer program product of claim 16, further comprising:
  facilitating sharing of a selected one of the first ones of the units of content using a drag-and-drop operation;
  wherein the drag-and-drop operation effects sharing of the selected one of the first units of content with one of a contact via a contacts list presented within the interface or a message recipient via a message window of the interface.

26. A computing device comprising a display and at least one processor configured to perform a method, comprising:
  provide for presentation via the display of a computing device for viewing by a user, an interface including a content window occupying a particular location in the interface, the interface being a web page;
  provide for presentation within the content window of the interface, units of content in a sequence such that the units of content rotate within the content window, wherein the units of content rotate within the content window such that each successive one of the units of content in the sequence replaces, in the content window of the interface, a previous one of the units of content in the sequence, first ones of the units of content comprising advertisements such that each of the first ones of the units of content includes an advertisement;
  provide for presentation within the content window of the interface, social media content such that the social media content replaces one of the first ones of the units of content within the content window, wherein the social media content has been identified by a server with reference to a group of users related to the user, wherein the social media correspond to online activities of individuals in the group of users;
  provide at least one control in the interface with which the user may move backward and forward in the sequence;
  wherein a request for additional units of content is made when the user attempts to move beyond the sequence of units of content using the control; and
  tracking user interaction with the sequence and the at least one control to measure the user engagement.

27. The computing device of claim 16, wherein the user has subscribed to an RSS feed from a particular web site, and wherein third ones of the units of content further comprise content relating to the particular web site or a notification of a new content posting to the particular web site.

28. A computer program product comprising at least one non-transitory computer-readable storage medium having computer program instructions stored therein configured to enable at least one computing device to perform a computer-implemented method, comprising:
  providing for presentation via a display of a computing device for viewing by a user, an interface including a content window occupying a particular location in the interface, the interface being a web page;
  providing for presentation within the content window of the interface, units of content in a sequence such that the units of content rotate within the content window, wherein the units of content rotate within the content window such that each successive one of the units of content in the sequence replaces, in the content window of the interface, a previous one of the units of content in the sequence, first ones of the units of content comprising advertisements, the interface including at least one control with which the user may move backward and forward in the sequence;
  providing for presentation within the content window of the interface, social media content such that the social media content replaces one of the first ones of the units of content within the content window, wherein the social media content has been identified by a server with reference to a group of users related to the user, wherein the social media correspond to online activities of individuals in the group of users;
  sharing a selected one of the units of content with a message recipient in response to a drag-and-drop operation that drags and drops the selected one of the units of content from the content window to a message window of the messaging interface or onto a contact in a contacts list of the messaging interface; and
  tracking user interaction with the sequence and the at least one control to measure the user engagement.

29. The computer program product of claim 28, the method further comprising tracking user interaction with the sequence to measure the user engagement.

30. The computer program product of claim 28 wherein the social media comprise a notification that one of the individuals in the group of users posted content and a link to the content posted by the one of the individuals in the group of users.

31. The computer program product of claim 28, wherein the group of users correspond to the contacts list.

* * * * *